(No Model.)
A. JOHNSON.
FINGER GAGE FOR RINGS.
No. 603,957. Patented May 10, 1898.
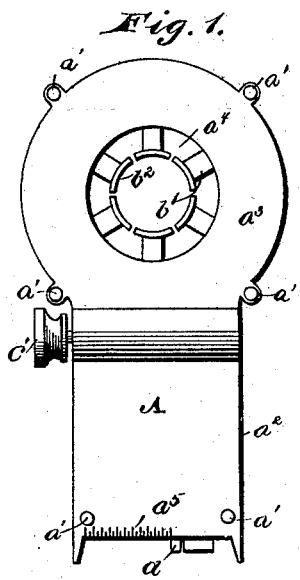
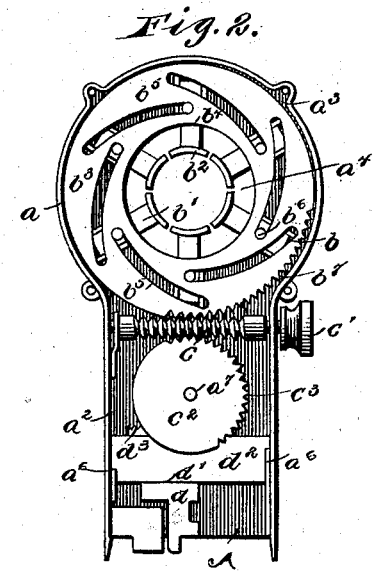
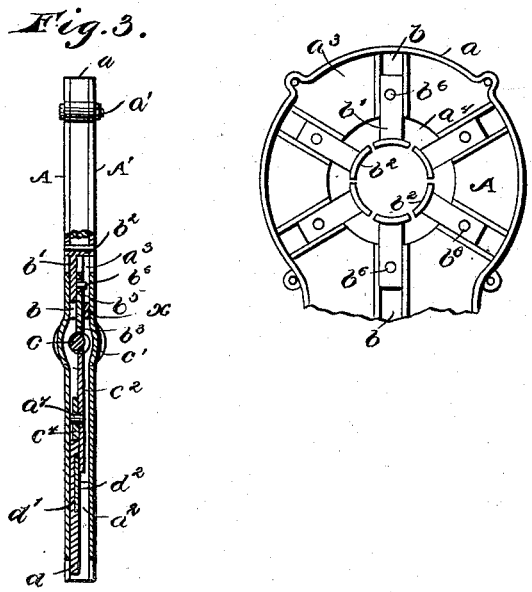
Witnesses
C. Bradway,
Victor J. Evans
Inventor
Alfred Johnson.
by John Wedderburn
Attorney

UNITED STATES PATENT OFFICE.

ALFRED JOHNSON, OF PHILADELPHIA, PENNSYLVANIA.

FINGER-GAGE FOR RINGS.

SPECIFICATION forming part of Letters Patent No. 603,957, dated May 10, 1898.

Application filed July 10, 1897. Serial No. 644,108. (No model.)

*To all whom it may concern:*

Be it known that I, ALFRED JOHNSON, of Philadelphia, in the county of Philadelphia and State of Pennsylvania, have invented certain new and useful Improvements in Measuring Instruments; and I do hereby declare the following to be a full, clear, and exact description of the invention, such as will enable others skilled in the art to which it appertains to make and use the same.

My invention relates to an improvement in measuring instruments, my object being to provide a simple structure for measuring fingers and the like provided with a scale upon which the measurements will be registered.

Broadly speaking, the device comprises a body portion, members upon said body portion for engaging the finger or similar object, means for operating said members, and means for indicating upon a scale the measurements made by the members for closing upon the fingers.

The invention consists in the various matters hereinafter described and claimed.

In the accompanying drawings, which illustrate my invention, Figure 1 is a face view of the present device. Fig. 2 is a plan view showing the back plate and the washer removed. Fig. 3 is a longitudinal sectional elevation. Fig. 4 is a bottom plan with the clamp-disk removed, and Fig. 5 is a detail.

Referring now more particularly to the drawings, A represents the face-plate of the present device, said face-plate being provided with a rim $a$, and A' indicates the rear plate, this rear plate being secured upon the face-plate by means of the bolts $a'$ or in any other convenient manner. One portion of the frame formed by the face-plate and the rear plate presents a handle $a^2$, open at the end of the plates, while the other portion of the frame forms a circular chamber $a^3$ for a purpose to be hereinafter described. At about the center of the circular chamber the plates A A' are provided with openings $a^4$. The measuring mechanism is located within the hollow portion of the handle.

Upon the inner side of the face-plate are provided grooves $b$, which radiate from the center of the circular portion, and fitted to slide within said grooves are the stems $b'$ upon plates $b^2$, the surface of each of these plates being curved in order that they may rest easily about the finger to be measured. Resting within the circular chamber is a disk $b^3$, having a circular opening $b^4$ in its center corresponding with the openings in the plates of the casing, said opening in the disk, together with the openings in the casing, being adapted to lie outside of the plates $b^2$. Cam-slots $b^5$ are formed in the disk $b^3$ and receive pins $b^6$ upon the stems $b'$. These cams are so shaped that in movement of the disk in one direction the stems will be moved inwardly—*i. e.*, toward the center of the circular chamber—thus bringing the plates $b^2$ toward each other, while in the reverse movement of the disk the stems will be moved upwardly and the plates $b^2$ thereby separated. A portion of the outer periphery of the disk is provided with teeth $b^7$, which mesh with the worm $c$, journaled in the sides of the casing to extend across the same, the shaft of said worm being provided with a thumb-piece $c'$, lying outside of the casing. It will at once be apparent that movement of the worm in one direction will cause corresponding movement of the disk and thus bring the plates $b^2$ together, while reverse movement of the thumb-piece will cause a reverse action of the plates $b^2$.

Referring now to the indicating mechanism, a pointer $d$, located in the casing, projects from the open end thereof and has movement along a suitable scale $a^5$ upon the face-plate of the casing. The body portion of the pointer is slotted, as at $d'$, to receive a cross-bar $d^2$, extending across the chamber in the handle of the tool, said cross-bar being seated in grooves $a^6$, formed in the sides of the casing. A rack $d^3$ is carried upon the rear of the pointer. Upon a pintle $a^7$, projecting from the face-plate of the casing, is a plate $c^2$, having upon one edge a segmental rack $c^3$, while upon the side of said plate is a second plate $c^4$, having a segmental rack $c^5$. The rack $c^3$ engages the worm $c$, while the rack $c^5$ engages the rack $d^3$ upon the pointer $d$. The plate $c^2$ extends above the cross-bar $d^2$, thus serving to further secure the cross-bar and consequently the pointer in place. A suitable washer $x$ can be provided between the cammed disk and the rear plate.

In operation the instrument being placed upon a finger, so that said finger is surrounded by the plates $b^2$, the thumb-piece is turned until the plates bear upon the finger as closely as it is desired that the ring fit. The size of ring necessary will be indicated by the pointer upon the scale.

The device is simple in construction, but efficient in operation.

Having thus described my invention, what I claim as new, and desire to secure by Letters Patent, is—

1. An instrument for measuring the external diameter or circumference of an object, comprising a frame, radially-movable members having heads at their inner ends adapted to close upon the object to be measured, a sliding pointer for indicating the result, and mechanism for simultaneously operating all of the radially-movable members and sliding the pointer in a rectilinear path, substantially as described.

2. A measuring instrument, embodying a frame, radially-movable members, a toothed rotatable disk for simultaneously operating said members, a sliding pointer, an operating-worm meshing with said disk, a mutilated gear-wheel meshing with said worm, and a pinion rotating with said gear-wheel and operatively connected to the pointer, substantially as described.

3. A measuring instrument of the character indicated, comprising a casing, members for engaging the article to be measured movable upon said casing, a pointer mounted to slide along said casing, a rack upon said pointer, a worm mounted in the casing, means for conveying motion from the worm to the measuring members, and a plate pivoted upon the casing, said plate having racks in mesh with the worm and with the rack upon the pointer whereby in the movement of the measuring members a corresponding motion is transmitted to the pointer; substantially as described.

4. A measuring instrument of the character indicated, comprising a casing, members upon said casing for engaging the article to be measured, slots upon said casing, a cross-bar removably fitting in said slots, a pointer having a groove therein fitting upon the cross-bar, means for transmitting motion to the measuring members, and means for imparting to the pointer a motion corresponding to that of the measuring members; substantially as described.

5. A measuring instrument of the character indicated, comprising a casing, members for engaging the article to be measured upon said casing, a worm journaled across said casing, connections between the worm and the measuring members for moving them in the operation of measuring, a pointer upon said casing, said pointer being provided with a groove, a cross-bar fitting in said groove and resting in slots upon the casing, a rack upon said pointer, a pintle upon the casing between the rack and the worm, a plate pivoted upon said pintle, said plate having a rack upon one side in engagement with the worm and extending above the cross-bar, and a second plate upon said first plate, said second plate being provided with a rack in engagement with the rack upon the pintle; substantially as described.

In testimony whereof I have signed this specification in the presence of two subscribing witnesses.

ALFRED JOHNSON.

Witnesses:
SAMUEL BALT,
JAMES G. ATTRIDGE.